United States Patent [19]

Bristol et al.

[11] 3,803,520

[45] Apr. 9, 1974

[54] ACOUSTIC SURFACE WAVE DEVICE WITH IMPROVED TRANSDUCER

[75] Inventors: Thomas W. Bristol, Orange; Gordon W. Judd, Yorba Linda, both of Calif.

[73] Assignee: Hughes Aircraft Company, Culver City, Calif.

[22] Filed: Apr. 26, 1973

[21] Appl. No.: 354,833

[52] U.S. Cl. ................. 333/30 R, 310/9.7, 310/9.8, 333/72
[51] Int. Cl. .......................... H03h 7/30, H03h 7/04
[58] Field of Search ............. 333/30 R, 72; 310/9.7, 310/9.8

[56] References Cited

UNITED STATES PATENTS 3,727,155 4/1973 De Vries .............................. 333/72
3,723,919 3/1973 Adler ............................ 333/30 R X

*Primary Examiner*—James W. Lawrence
*Assistant Examiner*—Marvin Nussbaum
*Attorney, Agent, or Firm*—W. H. MacAllister, Jr.; Paul M. Coble

[57] ABSTRACT

A transducer for acoustic surface wave devices is disclosed wherein the acoustic surface waves launched or received have a frequency corresponding to the third harmonic frequency of acoustic surface waves processed by a similarly dimensioned "double finger" transducer of the prior art. The transducer includes a pair of spaced electrodes, each having an elongated base portion extending along a longitudinal direction and a plurality of finger portions extending transversely toward the base portion of the other electrode. The finger portions of the respective electrodes are interdigitated in pairs like in the aforementioned "double finger" transducer. However, the longitudinal distance between the centers of adjacent finger portions is made equal to 3λ/4 and the width of each finger equal to 3λ/8, where λ is the wavelength of the acoustic surface waves launched or received at the finger portions in question.

6 Claims, 2 Drawing Figures

ACOUSTIC SURFACE WAVE DEVICE WITH IMPROVED TRANSDUCER

Figure 1:
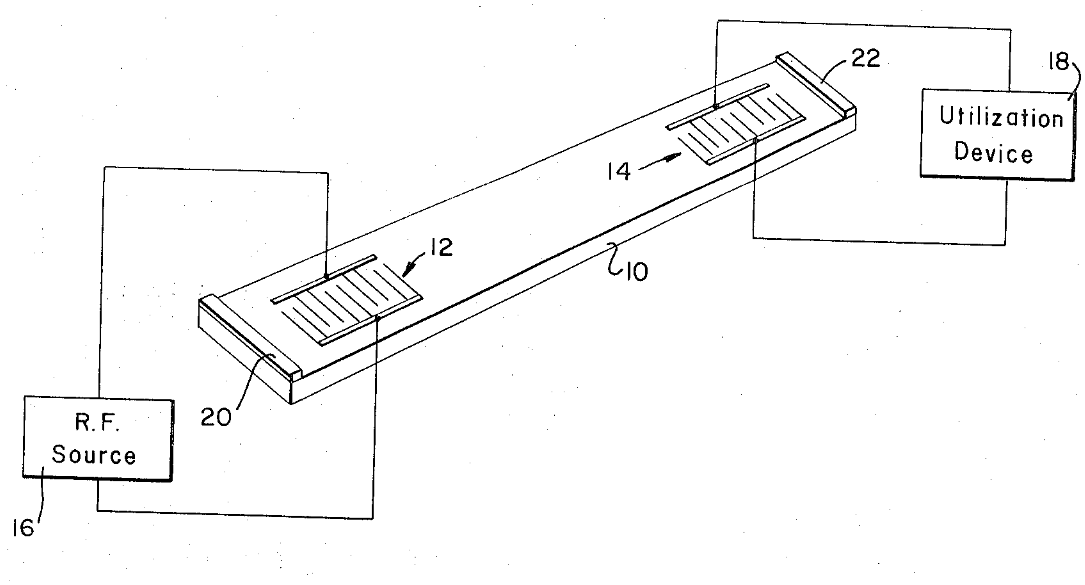

This invention relates generally to microwave acoustics, and more particularly relates to an improved electro-acoustic transducer structure for acoustic surface wave devices.

In recent years there has been increased interest in acoustic surface wave devices. Basically, an acoustic surface wave circuit comprises a source of rf signals, a smooth slab-like element or substrate of a material capable of propagating acoustic surface waves, and a load or utilization device. Electro-acoustic transducers are attached or held in close proximity to the substrate to convert the rf energy to surface waves in the material and vice versa. One of the significant advantages of acoustic surface wave devices results from the fact that acoustic surface waves travel considerably slower than do electromagnetic waves in free space. Hence, the wavelengths in question are shorter, and components such as delay lines, amplifiers, attenuators, filters, and couplers may be implemented using microminiature construction techniques.

In general, acoustic surface wave device substrates are fabricated from piezoelectric materials. With such substrates, the input and output transducers commonly take the form of interdigitated electrode fingers bonded or held in close proximity to the substrate surface. By properly designing the transducers, it is possible to obtain delay lines having electrical response characteristics which are specific functions of frequency. Such devices are termed delay line filters and find use in a broad range of communications and radar applications.

During operation of acoustic surface wave device transducers, the electrode fingers provide effective acoustic wave impedance discontinuities along the substrate surface, causing reflection of surface waves and scattering of energy into bulk waves propagating into the substrate. In the past adjacent pairs of electrode fingers functioning to launch or receive surface waves of wavelength λ were spaced by a distance equal to λ/2 along the substrate surface. For transducers having a large number of electrode finger pairs at spacings of approximately λ/2, the individual reflected surface waves would often add in phase to provide an overall large amplitude reflected wave which resulted in spurious multiple transit echoes in the delay lines and filters employing the transducer.

In order to reduce the synchronous addition of surface wave reflections from the transducer electrode fingers, a "double finger" transducer arrangement was devised in which the fingers of the respective electrodes are interdigitated in pairs rather than individually and the longitudinal distance between the centers of successive fingers is made approximately equal to λ/4 for the acoustic surface wave being launched or received at the electrode fingers in question. "Double finger" transducer arrangements are disclosed and claimed in patent application Ser. No. 292,014, filed Sept. 25, 1972, by Richard F. Hyneman and William R. Jones, and assigned to the assignee of the present invention.

While "double finger" transducer arrangements have proven highly successful in reducing the synchronous addition of surface wave reflections from the electrode fingers and substantially eliminating multiple transit echoes in the associated acoustic surface wave device, for a given acoustic surface wave operating wavelength λ, the electrode finger widths employed are half of the value required for previous transducer arrangements wherein successive electrode fingers are interdigitated individually. As transducers are designed for higher frequencies of operation, the required finger widths and spacings become correspondingly smaller. A maximum operating frequency is eventually reached due to practical limitations in fabricating transducer fingers of sufficiently small dimensions.

Accordingly, it is an object of the present invention to provide a transducer for an acoustic surface wave device which, for a given operating frequency, is considerately easily to fabricate than in the past and at the same time retains the improved performance characteristics of the aforementioned "double finger" transducer.

It is a further object of the invention to provide an acoustic surface wave device transducer which is capable of operating at higher frequencies than heretofore has been possible to achieve.

It is a still further object of the invention to provide a non-dispersive acoustic surface wave device transducer which provides a higher Q and which, for a given center frequency and bandwidth, requires fewer electrode fingers than an otherwide comparable transducer of the prior art.

It is still another object of the invention to provide a dispersive acoustic surface wave device transducer which, for a given electrode finger width and spacing, achieves a greater operating bandwidth than with a transducer of the prior art.

An acoustic surface wave device according to the invention comprises a substrate of a material capable of propagating acoustic surface wave energy and at least one electro-acoustic transducer coupled to a region of the surface of the substrate. The transducer includes first and second sets of substantially parallel elongated electrode elements spaced from one another along a given direction. Successive pairs of electrode elements of the first set are interdigitated with successive pairs of electrode elements of the second set along the given direction. Electrical circuitry in the form of either a source of rf signals or an electrical load is coupled between electrode elements of the first set and the electrode elements of the second set. The distance along the given direction between the centers of adjacent electrode elements is made approximately equal to 3λ/4, where λ is the wavelength of acoustic surface wave energy launched or received at the aforementioned adjacent electrode elements.

Figure 2:
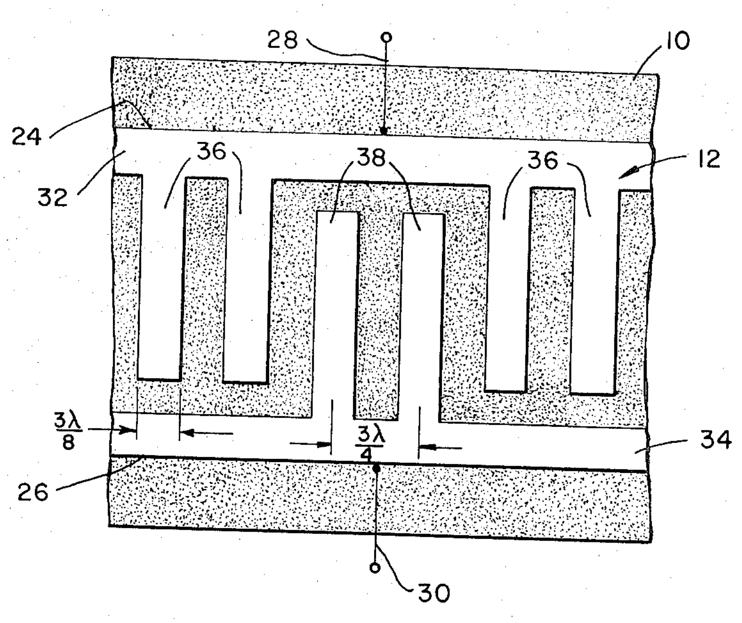

Additional objects, advantages and characteristic features of the present invention will become readily apparent from the following detailed description of a preferred embodiment of the invention when considered in conjunction with the accompanying drawing wherein:

FIG. 1 is a simplified pictorial view illustrating an acoustic surface wave delay line filter which may be constructed in accordance with the invention; and FIG. 2 is a plan view of a portion of a transducer for a filter such as that of FIG. 1 constructed according to the invention.

Referring to FIG. 1 with greater particularity, an acoustic surface wave delay line filter is shown fabricated on an elongated substrate 10. The substrate 10 is provided with an input transducer 12 adjacent one end and an output transducer 14 adjacent to the other end. A source of rf signals 16 is electrically coupled to input transducer 12, while a utilization device 18 which constitutes an electrical load is coupled to the output transducer 14. Slabs 20 and 22 of acoustic energy absorbing material may be disposed on the surface of the substrate 10 at the respective ends thereof to provide acoustic terminations for the filter.

The material from which the substrate 10 is fabricated is of a type suitable for propagating acoustic surface waves. Many suitable piezoelectric materials have been employed for this purpose, and characteristics of these materials are set forth in recent technical literature. For example, $LiNbO_3$, CdS, ZnO, $Bi_{12}GeO_{20}$ and $SiO_2$, to mention only a few, have been employed. The particular material to be used in a given device may be selected according to the frequency range of intended operation and the acoustic loss which may be tolerated in the frequency range of interest.

Generally, the surface of substrate 10 is ground and polished to an optical quality finish in order to reduce surface imperfections to a minimum. Input and output transducers 12 and 14 are deposited, bonded or otherwise attached to the polished surface of substrate 10. Transducers 12 and 14 may be formed of any suitable electrically conductive material such as aluminum or gold. The thickness of the transducer material is typically on the order of 500 to 1,500A or more.

Acoustic surface wave delay lines and delay line filters of the general type depicted in FIG. 1 have a wide variety of uses. A typical use for use a delay line is in the signal processing portions of pulse compression radar systems. In a radar receiver, for example, the delay line may be of the dispersive type (i.e., providing a variable delay as a function of frequency) for pulse compression of a transmitted chirp radar pulse. The delay line may also be nondispersive (i.e., provide a constant delay as a function of frequency) and find use in bandpass frequency filters and delay equalization networks.

Referring to FIG. 2, a transducer which may function as either input transducer 12 or output transducer 14 in the filter of FIG. 1 (and which is designated as transducer 12 for purpose of illustration) is shown in greater detail. Transducer 12 comprises a pair of electrodes 24 and 26 bonded to the surface of substrate 10. Electrodes 24 and 26 may be respectively connected to opposite polarity terminals of an rf source such as 16 of FIG. 1 by means of respective leads 28 and 30.

Electrodes 24 and 26 comprise respective elongated base portions 32 and 34 disposed parallel to one another and extending lengthwise along the substrate 10. Extending transversely from the respective base portions 32 and 34 and substantially across the substrate surface between the base portions 32 and 34 are a plurality of electrode finger portions 36 and 38, respectively. Each pair of successive electrode finger portions 36 extend from the same electrode base portion 32, while the next pair of successive electrode finger portions 38 extend from the other electrode base portion 34. In other words, the finger portions of the respective electrodes are interdigitated in pairs like in the "double finger" transducer arrangement discussed above.

However, in a transducer according to the invention, the distance between the centers of successive electrode finger portions 36 and/or 38 along the longitudinal direction of base portions 32 and 34 is made equal to $3\lambda/4$, where $\lambda$ is the wavelength of the acoustic surface waves being launched or received at electrode finger portions in question. Also, each electrode finger portion 36 and 38 has a width (i.e., extent along the longitudinal direction of base portions 32 and 34) equal to $3\lambda/8$. Thus, acoustic surface waves launched or received by a transducer according to the invention have a frequency corresponding to the third harmonic frequency of acoustic surface waves processed by a similarly dimensioned "double finger" transducer of the prior art.

It should be noted that for a non-dispersive transducer operating in the vicinity of a single frequency, the electrode finger width and spacing would be uniform throughout the length of the transducer. In particular, the longitudinal distance between the centers of successive finger portions 36 and/or 38 would be made equal to $3\lambda_o/4$, where $\lambda_o$ is the wavelength corresponding to the center frequency of the transducer, while the width of the fingers 36 and 38 would be made equal to $3\lambda_o/8$.

On the other hand, for a dispersive transducer of the type used in chirp radar systems, the electrode finger width and spacing would be varied in a gradual fashion along the length of the transducer. At the low frequency end of the transducer the finger width would be made equal to $3\lambda_{max}/8$ and the longitudinal distance between the centers of successive fingers equal to $3\lambda_{max}/4$, where $\lambda_{max}$ is the maximum wavelength of acoustic surface waves processed by the transducer. At the opposite, or high frequency, end of the transducer the electrode finger width would be made equal to $3\lambda_{min}/8$ and the longitudinal distance between centers of successive fingers equal to $3\lambda_{min}/4$, where $\lambda_{min}$ is the minimum wavelength of acoustic surface waves processed by the transducer.

Since successive electrode fingers of a transducer according to the invention are spaced by a distance of $3\lambda/4$, reflected surface waves from each pair of adjacent fingers are 540° out of phase with one another and tend to cancel. Thus, the synchronous addition of surface wave reflections from the electrode fingers is minimized, and mulitple transit echoes of the signals being processed are substantially eliminated.

In addition, for a given operating frequency, the electrode finger widths of a transducer according to the invention are 1.5 times greater than for transducer arrangements wherein the electrode fingers are interdigitated individually and three times greater than for "double finger" transducer arrangements of the prior art, thereby enabling transducers according to the invention to be more easily fabricated than transducers of the prior art.

Also, for a given electrode finger width, a transducer according to the invention will operate at a frequency 1.5 times higher than prior art transducers wherein the electrode fingers are interdigitated individually and three times higher than "double finger" transducer arrangements of the prior art. Thus, since the maximum operating frequency of an acoustic surface wave transducer is limited by the smallest electrode size capable of being fabricated, a transducer according to the invention is able to operate at a frequency 1.5 times higher than heretofore has been possible to achieve. Moreover, since it has been found experimentally that the third harmonic excitation efficiency for a "double finger" transducer is essentially the same as the excitation efficiency for its fundamental response, all of the foregoing advantages can be achieved without an increase in insertion loss.

It is further pointed out that a non-dispersive transducer according to the invention will operate at a center frequency three times greater than a non-dispersive "double finger" transducer according to the prior art (for a given electrode finger width and spacing) and with a bandwidth the same as that of the prior art "double finger" transducer, thus increasing the Q of the transducer by factor of three. Alternatively, when a non-dispersive transducer according to the invention is designed for the same bandwidth and center frequency as a "double finger" transducer of the prior art, the number of electrode fingers required is reduced by a factor of three, thereby enabling easier and less costly transducer fabrication.

As far as a dispersive transducer is concerned, for a given electrode finger width and spacing, the bandwidth and the center frequency of a dispersive transducer according to the invention are both three times larger than for a "double finger" dispersive transducer of the prior art. Thus, the present invention is able to vastly increase the operating frequency and the bandwidth of dispersive acoustic surface wave transducers, while at the same time minimizing distortion of the desired output signals due to multiple transit echoes and other spurious responses.

Although the present invention has been shown and described with reference to a particular embodiment, nevertheless various changes and modifications which are obvious to a person skilled in the art to which the invention pertains are deemed to lie within the spirit, scope and contemplation of the invention.

What is claimed is:

1. An acoustic surface wave device comprising:
a substrate of a material capable of propagating acoustic surface wave energy;
at least one electro-acoustic transducer coupled to a region of a surface of said substrate;
said transducer including first and second sets of substantially parallel elongated electrode elements spaced from one another along a first direction, electrical circuit means coupled between the electrode elements of said first set and the electrode elements of said second set, successive pairs of electrode elements of said first set being interdigitated with successive pairs of electrode elements of said second set along said first direction, and the distance along said first direction between the centers of adjacent electrode elements being approximately equal to 3λ/4, where λ is the wavelength of acoustic surface wave energy launched or received at said adjacent electrode elements.

2. An acoustic surface wave device according to claim 1 wherein said electrical circuit means comprises a source of rf signals.

3. An acoustic surface wave device according to claim 1 wherein said electrical circuit means comprises an electrical load.

4. An acoustic surface wave device according to claim 1 wherein the extent of each said electrode element along said first direction is approximately equal to 3λ/8, where λ is the wavelength of the acoustic surface wave energy launched or received at the said electrode element.

5. An acoustic surface wave device comprising:
a substrate of a material capable of propagating acoustic surface wave energy;
at least one electro-acoustic transducer coupled to a region of a surface of said substrate;
said transducer including a pair of spaced electrodes, each having an elongated base portion extending along a first direction and a plurality of finger portions extending transversely toward the base portion of the other electrode, said finger portions being arranged such that two successive finger portions along said first direction extend from the base portion of one of said electrodes and the next two successive finger portions along said first direction extend from the base portion of the other of said electrodes, and the distance along said first direction between the centers of adjacent finger portions being approximately equal to 3λ/4, where λ is the wavelength of acoustic surface wave energy launched or received at said adjacent finger portions.

6. An acoustic surface wave device according to claim 5 wherein the extent of each said finger portion along said first direction is approximately equal to 3λ/8, where λ is the wavelength of the acoustic surface wave energy launched or received at the said finger portion.

* * * * *